(12) United States Patent
Hwang

(10) Patent No.: US 10,455,463 B2
(45) Date of Patent: Oct. 22, 2019

(54) HANDOVER SUPPORTING SCHEME IN CELLULAR MOBILE COMMUNICATION SYSTEM

(71) Applicant: Samsung Electronics Co., Ltd., Suwon-si, Gyeonggi-do (KR)

(72) Inventor: Keun-Chul Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 59 days.

(21) Appl. No.: 15/036,251

(22) PCT Filed: Nov. 12, 2014

(86) PCT No.: PCT/KR2014/010855
§ 371 (c)(1),
(2) Date: May 12, 2016

(87) PCT Pub. No.: WO2015/072743
PCT Pub. Date: May 21, 2015

(65) Prior Publication Data
US 2016/0302113 A1 Oct. 13, 2016

(30) Foreign Application Priority Data
Nov. 12, 2013 (KR) .......................... 10-2013-0136947

(51) Int. Cl.
*H04W 36/00* (2009.01)
*H04W 16/06* (2009.01)
(Continued)

(52) U.S. Cl.
CPC ....... *H04W 36/0072* (2013.01); *H04L 5/0005* (2013.01); *H04L 5/0098* (2013.01);
(Continued)

(58) Field of Classification Search
CPC . H04W 36/0072; H04W 36/08; H04W 16/06; H04W 88/08; H04L 5/0005; H04L 5/0098; H04B 1/713
See application file for complete search history.

(56) References Cited

U.S. PATENT DOCUMENTS

2005/0288026 A1 12/2005 Byun et al.
2007/0129080 A1* 6/2007 Okuda ................. H04W 16/10
455/452.1
(Continued)

FOREIGN PATENT DOCUMENTS

KR 10-2005-0117445 A 12/2005
KR 10-2007-0046289 A 5/2007
(Continued)

*Primary Examiner* — Jackie Zuniga Abad
(74) *Attorney, Agent, or Firm* — Jefferson IP Law, LLP

(57) ABSTRACT

The present disclosure proposes a method for supporting a handover by a base station controller in a cellular mobile communication system including a terminal for performing a handover from a serving cell base station to a target cell base station, the method comprising the steps of: determining handover performance of the terminal; checking whether a resource of the same frequency and time slot as a frequency and time slot of a resource in use by the serving cell base station is usable in the target cell base station; and allocating a resource of the same frequency and time slot to the target cell base station, and transmitting a message indicating channel activation of the allocated resource to the target cell base station.

16 Claims, 12 Drawing Sheets

(51) Int. Cl.
  *H04L 5/00* (2006.01)
  *H04W 36/08* (2009.01)
  *H04B 1/713* (2011.01)
  *H04W 88/08* (2009.01)

(52) U.S. Cl.
  CPC ........... *H04W 16/06* (2013.01); *H04W 36/08* (2013.01); *H04B 1/713* (2013.01); *H04W 88/08* (2013.01)

(56) References Cited

U.S. PATENT DOCUMENTS

| | | | |
|---|---|---|---|
| 2007/0167165 A1* | 7/2007 | Yang | H04W 36/0055 455/439 |
| 2011/0063989 A1* | 3/2011 | Yang | H04B 7/022 370/252 |
| 2011/0122793 A1 | 5/2011 | Pecen et al. | |
| 2014/0220976 A1 | 8/2014 | Hwang et al. | |
| 2014/0334445 A1 | 11/2014 | Wei | |

FOREIGN PATENT DOCUMENTS

| | | |
|---|---|---|
| KR | 10-2010-0048386 A | 5/2010 |
| KR | 10-2013-0045365 A | 5/2013 |
| KR | 10-2014-0100631 A | 8/2014 |

\* cited by examiner

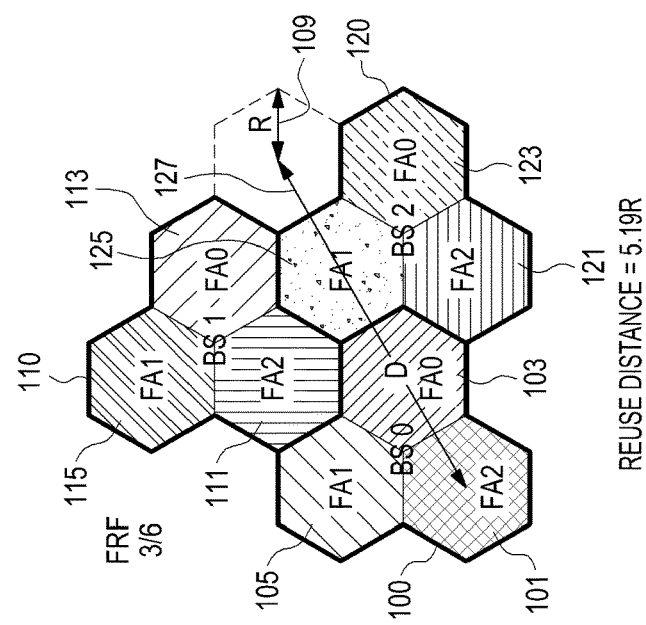
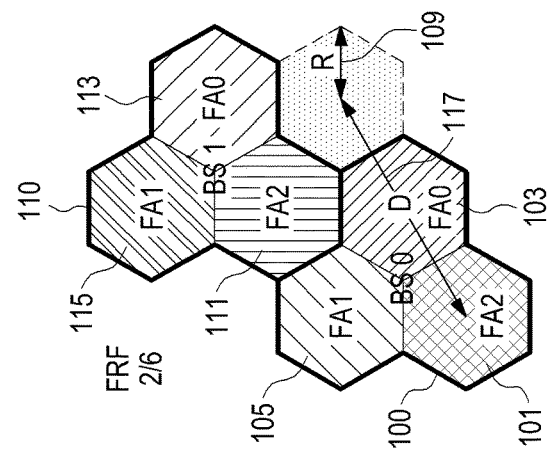
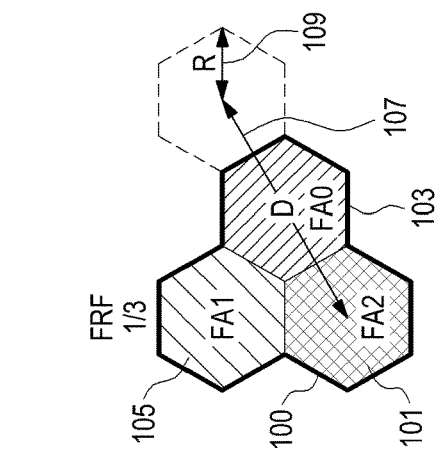
FIG.1A (RELATED ART)
FIG.1B (RELATED ART)
FIG.1C (RELATED ART)

FIG.3

HANDOVER SUPPORTING SCHEME IN CELLULAR MOBILE COMMUNICATION SYSTEM

CROSS-REFERENCE TO RELATED APPLICATION(S)

This application is a U.S. National Stage application under 35 U.S.C. § 371 of an International application filed on Nov. 12, 2014 and assigned application number PCT/KR2014/010855, which claimed the benefit of a Korean patent application filed on Nov. 12, 2013 in the Korean Intellectual Property Office and assigned Serial number 10-2013-0136947, the entire disclosure of which is hereby incorporated by reference.

TECHNICAL FIELD

This disclosure relates to techniques for supporting a handover in cellular mobile communication systems, and more specifically to, methods for allocating resources for the handover and devices supporting the same.

BACKGROUND ART

Cellular mobile communication systems have been developed for the purpose of providing communication while ensuring the mobility of the user and have reached a stage to provide high-speed data communication services as well as voice communication services thanks to the rapid development of technology.

Handover in the cellular mobile communication systems refers to the transfer of a call between base stations to provide seamless communication to the mobile terminal. In global system for mobile communications (GSM), an example of cellular mobile communication system, inter-cell handover, among others, is the most frequent handover for the mobile terminal.

Upon inter-cell handover, when the terminal moves, a voice disconnection may occur as long as a handover latency due to signaling between the base station and the terminal, or a call drop may take place in case the delay become longer.

Further, GSM system is a frequency division duplex (FDD) system that uses different frequencies for downlink and uplink. The GSM system uses Frequency division multiple access (FDMA) and time division multiple access (TDMA), in combination, for separating users.

In general, the GSM system allocates different frequencies so that adjacent cells use the different frequencies in a fixed manner. The GSM system adopts a scheme in which the cells using different frequencies are grouped, and the frequency reuse applies to each group of cells. As information for representing a frequency reuse scheme, a frequency reuse factor (FRF) is used. For example, in the frequency reuse factor (FRF) represented by X/Y, X is a factor representing the number of cells (or sites) within a unit group, and Y is a factor representing the number of sectors in the unit group.

FIG. 1 is a view illustrating a frequency arrangement method upon a frequency reuse operation of a typical GSM system.

The frequency reuse scheme for a cell operation in a mobile communication network of the GSM system pre-allocates a frequency to be used in the sector and/or cell as shown in FIG. 1 without overlap to generate a reuse pattern in the group unit and repeatedly applies the reuse pattern to the overall network.

FIG. 1(a) illustrates that non-overlapping frequencies, respectively, are allocated to three sectors 101, 103, and 105 constituting a cell 100. The different patterns respectively marked in the sectors of FIG. 1 mean the allocation of different frequencies. In this case, the frequency reuse factor (FRF) is ⅓. In FIG. 1(a), the frequency reuse distance, which is the distance 107 between different sectors or cells reusing the same frequency is about 3.46 times the sector radius (R) 109.

FIG. 1(b) illustrates that non-overlapping frequencies, respectively, are allocated to a total of six sectors 101, 103, 105, 111, 113, and 115 constituting two cells 100 and 110. In this case, the frequency reuse ratio is 2/6. Also in FIG. 1(b), it can be seen that the frequency reuse distance 117 is about 3.46 times the sector radius (R) 109.

FIG. 1(c) illustrates that non-overlapping frequencies, respectively, are allocated to a total of nine sectors 101, 103, 105, 111, 113, 115, 121, 123, and 125 constituting three cells 100, 110, and 120. In this case, the frequency reuse ratio is 3/9. In FIG. 1(c), the frequency reuse distance 127 is about 5.19 times the sector radius (R) 109.

That is, in case the frequency reuse repeatedly applies to the entire network with each unit group of three cells containing the nine sectors, the frequency reuse distance may lengthen, that is, interference from adjacent cells or adjacent sectors is likely to be lowered.

Typically, broadcast control channel (BCCH) carriers to which frequency hopping is not applied are operated as FRF 4/12, and traffic channel (TCH) to which frequency hopping applies is operated as FRF 3/9.

However, such frequency reuse scheme has the limitation that although additional frequency resources are required for call processing due to concentration of voice calls in a particular cell, other frequencies except for ones allocated to the cell cannot be used. That is, the cellular system using the conventional frequency reuse operating scheme needs to be enhanced in terms of frequency efficiency.

DISCLOSURE

Technical Problem

This disclosure provides techniques for addressing problems with the above-described conventional mobile communication system.

The present disclosure provides a technique in which a base station controller handles a handover of a terminal when the terminal performs inter-cell handover to eliminate the need for the terminal to perform signaling required for the handover.

The present disclosure further provides a scheme enabling a single cell to use all the frequencies available for the entire network by operating a particular cell and its adjacent cell as if they are a single cell so that the specific cell and the adjacent cell may use the same frequency in a mobile communication network.

Further, the present disclosure provides an appropriate resource allocation scheme and terminal mobility supporting scheme appropriate for the single-cell environment.

Technical Solution

This disclosure proposes a method of supporting a handover by a base station controller in a cellular mobile communication system including a terminal performing the handover from a base station of a serving cell to a base station of a target cell, the method comprises determining to perform the handover of the terminal, checking whether a resource of the same frequency and time slot as a frequency and time slot of a resource being used by the base station of the serving cell is available to the base station of the target cell, and allocating the resource of the same frequency and time slot to the base station of the target cell, and transmitting a message instructing to activate the channel allocated resource to the base station of the target cell.

This disclosure also proposes a base station control device for supporting handover of a terminal in a cellular mobile communication system including a terminal performing handover from a base station of a serving cell to a base station of a target cell comprises a controller determining to perform the handover of the terminal, checking whether a resource of the same frequency and time slot as a frequency and time slot of a resource being used by the base station of the serving cell is available to the base station of the target cell, and allocating the resource of the same frequency and time slot to the base station of the target cell, and transmitting a message instructing to activate the instructing to activate the channel allocated resource to the base station of the target cell, and a transceiver transmitting and receiving a message with the terminal controlled by the controller, the base station of the serving cell, and the base station of the target cell.

Advantageous Effects

To address the problems of the conventional art, according to preferred embodiments of the present disclosure, all the cells to which the instant techniques are applied are configured to use all available frequencies, increasing the frequency efficiency of a mobile communication network and effectively reducing the possibility of handover delay or call loss that may occur during a hand-over of a terminal.

BRIEF DESCRIPTION OF THE DRAWINGS

FIG. 1 is a view illustrating a frequency arrangement scheme upon operating frequency reuse in a typical GSM system;

FIG. 3 is a view illustrating an example for separating frequency resources and generating a channel group according to a preferred embodiment of the present disclosure;

BEST MODE

Hereinafter, embodiments of the present disclosure are described in detail with reference to the accompanying drawings. When determined to make the subject matter of the present disclosure unclear, the detailed of the known functions or configurations may be skipped. The terms as used herein are defined considering the functions in the present disclosure and may be replaced with other terms according to the intention or practice of the user or operator. Therefore, the terms should be defined based on the overall disclosure.

Before detailing the present disclosure, some terms as used herein may be interpreted as follows, for example. However, it should be noted that the present disclosure is not limited thereto.

The base station is an entity communicating with a UE and may be denoted BS, NodeB (NB), eNodeB (eNB), or Access Point (AP).

The user equipment is an entity communicating with a base station, may be denoted UE, mobile station (MS), mobile equipment (ME), device, or terminal.

Hereinafter, as an example of a mobile communication system, a GSM system will be described. However, embodiments of the present disclosure may be applied to other mobile communication system, within limits not detrimental to the essence of this disclosure. That is, in case the handover of the terminal is a system started by the base station or base station controller (base station oriented), embodiments of the present disclosure can be applied in communication systems other than the GSM systems. Further, techniques relating to a single cell frequency allocation, which will be described hereinafter may be applied in another cellular communication system.

In the present disclosure, GSM system may include one or more BTS (base station) forming GSM cell and base station controller (BSC) controlling or managing BTS. Further, GSM system may further include mobile switching center (MSC).

In the present disclosure, single-cell frequency allocation may be interpreted to mean that the frequency reuse of FRF 1 is applied to the entire network by enabling adjacent cells to use the same frequency.

A. Synchronization Between Base Stations

Since a handover support method of the terminal according to an embodiment of the present disclosure enables use of the same resource between base stations, it is preferable that synchronization between the base stations is preceded.

Specifically, the synchronization of the system frame number may be performed between the base stations. Through the synchronization of the system frame number, the same frequency hopping may apply between base stations.

Further, the synchronization of a time slot boundary between the base stations may be performed. The synchronization of time slot boundary is necessary for control of Timing Advance (TA). In general, since the uplink (UL) TA search range is ±3 time slots, the inter-base station synchronization error during handover should be ±11 microseconds. (1 time slot=3.69 microseconds)

B. Frequency Setting

Figure 2:
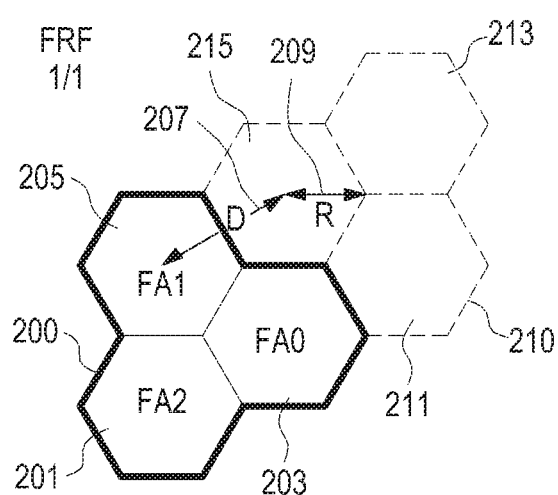
FIG. 2 is a view illustrating a frequency arrangement scheme using the frequency reuse factor of 1/1 in a cellular system according to a preferred embodiment of the present disclosure.

FIG. 2 is a view illustrating a frequency arrangement method using the frequency reuse factor of 1/1 in a cellular system according to a preferred embodiment of the present disclosure.

According to a preferred embodiment of the present disclosure, such configuration is made as shown in FIG. 2 so that the frequency reuse factor of 1/1 equals 1 to enable use of all possible frequencies allocable to all the cells constituting the network.

Referring to FIG. 2, it is shown that the same frequency is allocated to each of three sectors 201, 203, and 205 constituting one cell 200. Each sector in the cell 200 of FIG. 2 having the same pattern means that the same frequency (i.e., one frequency) is allocated to all of the sectors 201, 203, and 205. In this cases, the frequency reuse factor (FRF) has the value of 1/1. In FIG. 2, it may be seen that the frequency reuse distance ratio 207 is about 1.73 times the sector radius (R) 209.

In an embodiment of the disclosure, since frequency reuse repeatedly applies to the entire network using one cell as a unit group, all of the cells in the network use the same frequency. In this case, even though the frequency reuse distance is short, interference that may be caused by using the same inter-cell frequency may be prevented by establishing synchronization between the base stations that serves the cell coverage.

As such, the frequency allocation of the frequency reuse factor of 1 results in an improvement in the spectrum efficiency of the network. Further, the frequency allocation of the frequency reuse factor of 1 may enable support of existing users even in case the frequency resources are reduced due to the frequency re-farming (which refers to reuse part of all or some of the frequencies now in use for other communication services, such as LTE.)

Figure 3:
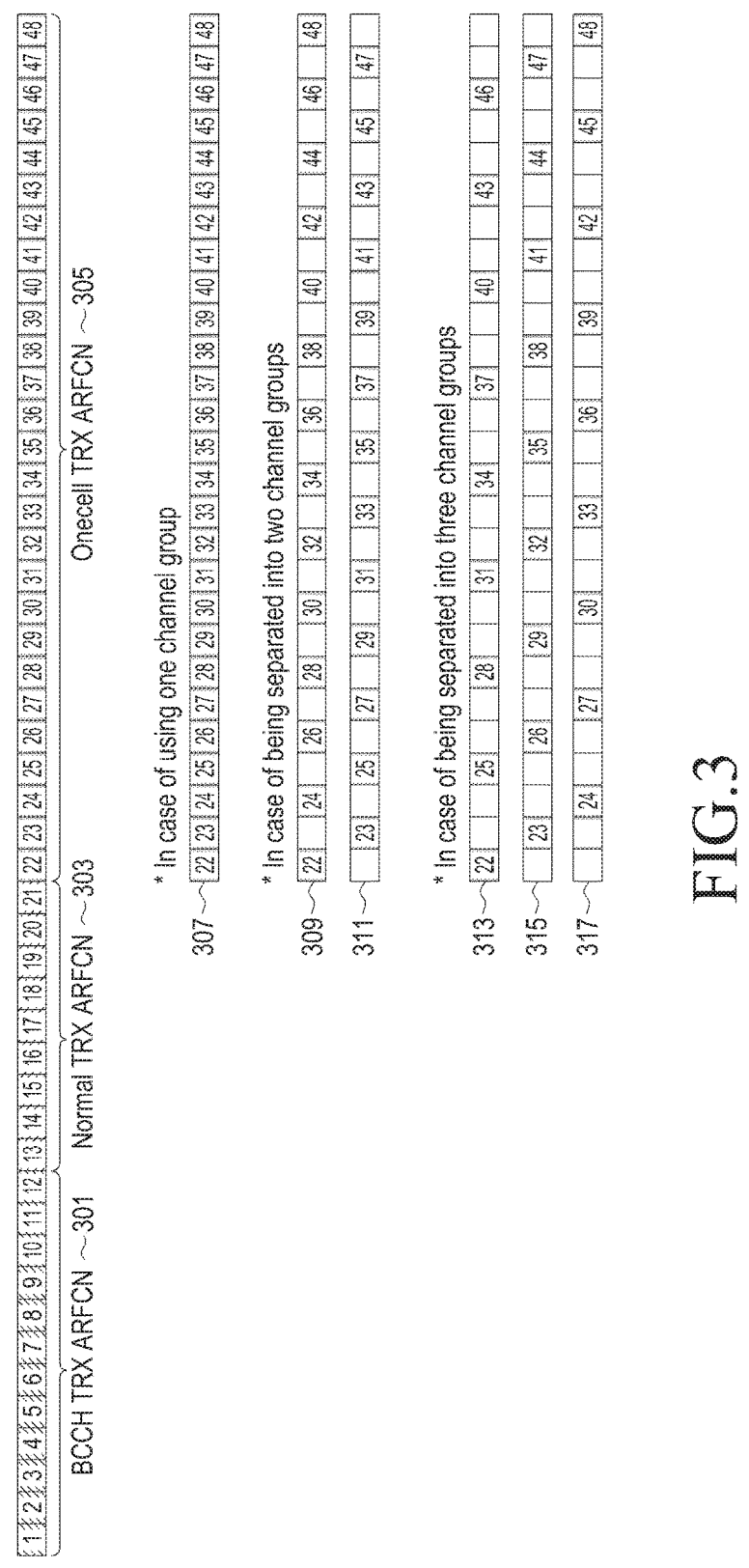

FIG. 3 is a view illustrating an example of separating frequency resources and generating a channel group according to a preferred embodiment of the present disclosure.

Frequency resources in the GSM system include a frequency represented by an absolute radio-frequency channel number (ARFCN). The frequency resources may also include Broadcast allocation (BA), mobile allocation (MA), hopping sequence number (HSN), and mobile allocation index offset (MAIO) information used for user allocation. Frequency hopping includes a process of determining the mobile allocation index (MA) of the current frame number (FN) among the MAs using the HSN and the MAIO.

Broadcast control channel (BCCH) may be used for cell selection, cell reselection, and serving base station tracking, etc. for each cell. Traffic channel (TCH) may be used for transmission of data traffic. According to an embodiment of the present disclosure, an operation may be performed with a frequency reuse factor (FRF) of 4/12 for the BCCH and an FRF of 1/1 for the TCH, for example.

BCCH transmission/reception (TRX) frequency resources 301 and TCH transmission/reception (TRX) frequency resource 303 and 305 may be operated separately. Frequency resources for TCH transmission and reception may be separated into single-cell transmission/reception frequency resources 305 and normal transmission/reception frequency resources 303 (which may be operated in a legacy scheme, for example).

Packet data channel (PDCH) for general packet radio service (GPRS)/enhanced data GSM environment (EDGE) may be first configured for the BCCH transceiver frequency resources 301 or the normal transceiver frequency resources 303, and in case the resources for PDCH are insufficient for each cell, the single-cell transceiver frequency resource 305 may be configured as resources for the PDCH. As such, resources may be shared between the TCH and the PDCH.

The single-cell transceiver frequency resource 305 allocable to each cell may be configure to generate up to N-channel groups (N=1, 2, . . . ) in a cell. For example, in the case of one channel group, the single-cell transceiver frequency resources may be generated as denoted in 307 of FIG. 3, and in the case of two channel groups, the single-cell transceiver frequency resources may be generated as denoted in 309 and 311 of FIG. 3. In the case of three channel groups, the single-cell transceiver frequency resources may be generated as denoted in 313, 315, and 317 of FIG. 3. Further, the ARFCN in the channel group may be configured in the same form in all of the cells to which a single cell frequency allocation technique applies.

The channel group for single-cell transceiver frequency resource 305 may be configured considering, e.g., the size of immediate assignment message, radio unit integrate bandwidth (RU IBW) (which is a wireless unit aggregate bandwidth) constraints, and diversity gain.

According to an embodiment of the present disclosure, the MAIO is configured to be able to allocate all available MAIO values in all of the cells to which that single-cell frequency allocation is applied. In the cell, the MAIO is allocated/operated so that a frequency separation between transmit frequency and receive frequency is two or more considering intra-cell adjacent channel interference.

Further, according to an embodiment of the present disclosure, all of the cells to which single cell frequency allocation applies have the same HSN value. Further, each cell may have a separate cell-specific HSN together with a cell-common HSN. When an adjacent cell may use all of the orthogonal frequency/time resources, a specific cell may allow its HSN to be different from the HSN of the adjacent cell using the cell-specific HSN to increase allowable channels so that even when random collision is allowed, a call may be allocated.

C. Initial Call Allocation

In the present disclosure, each cell uses a scheme for first allocating a time slot with the least interference to a frequency unused in the adjacent cell when initial call is allocated in order to address inter-cell interference due to the allocation of the frequency reuse factor of 1. To that end, each cell may first allocate the MAIO unused in the adjacent cell through MAIO management. A neighbor list may be referenced for information on the adjacent cell.

Resource management for each cell may be performed in real-time using a two-dimensional (i.e., frequency and time) resource management table. Here, the size of the frequency resources may be determined by (the number of unit resources constituting the channel group×the number of MAIOs) (i.e. the number of unit resources constituting the single-cell transceiver frequency resource). The size of the time resources may be managed to be 16, e.g., considering a half rate, which is a GSM voice coding system. That is, the size of resource management table may be (the number of unit resources constituting the channel group×MAIO)×16.

In case the size of the single cell transceiver frequency resources is 16, the resource management table may be managed in a 16*16 matrix, and whether resources are assigned may be indicated with one bit and managed in real-time. The resource management table of a particular cell may be shared with all of the neighboring cells that have the particular cell as an adjacent cell. Meanwhile, resources allocated for PDCH in the particular cell may be considered and managed as allocated resources regardless of whether they have been allocated for user traffic.

Interference management between base stations by a BSC may be performed by the management of an uplink received signal strength indicator (UL RSSI) value corresponding to a particular resource of the resource management table through idle channel measurement (ICM). The RSSI value is managed for each cell and is not shared between cells. Selectively, the BSC may also manage an interference table recording UL RSSI values respectively corresponding to the resources of the resource management tale to manage interference between base stations. Meanwhile, the ICM may use a value measured in a frame that is not an idle frame.

Resource allocation by the BSC operates in such a way as to select allocable resources and then allocate the resource with the least UL interference (for example, the resource with the lowest RSSI) among the selected allocable resources. Here, the allocable resources refer to resources not used by any neighboring cell and may be identified via the resource management table. The resource with the least UL interference means a resource with the smallest RSSI value in the interference table among the allocable resources. Meanwhile, the BSC may also make allocation to the resource with the least UL Interference using the specific-cell HSN, rather than the cell-common HSN in case there are no allocable resources.

D. Mobility Support

Figure 4:
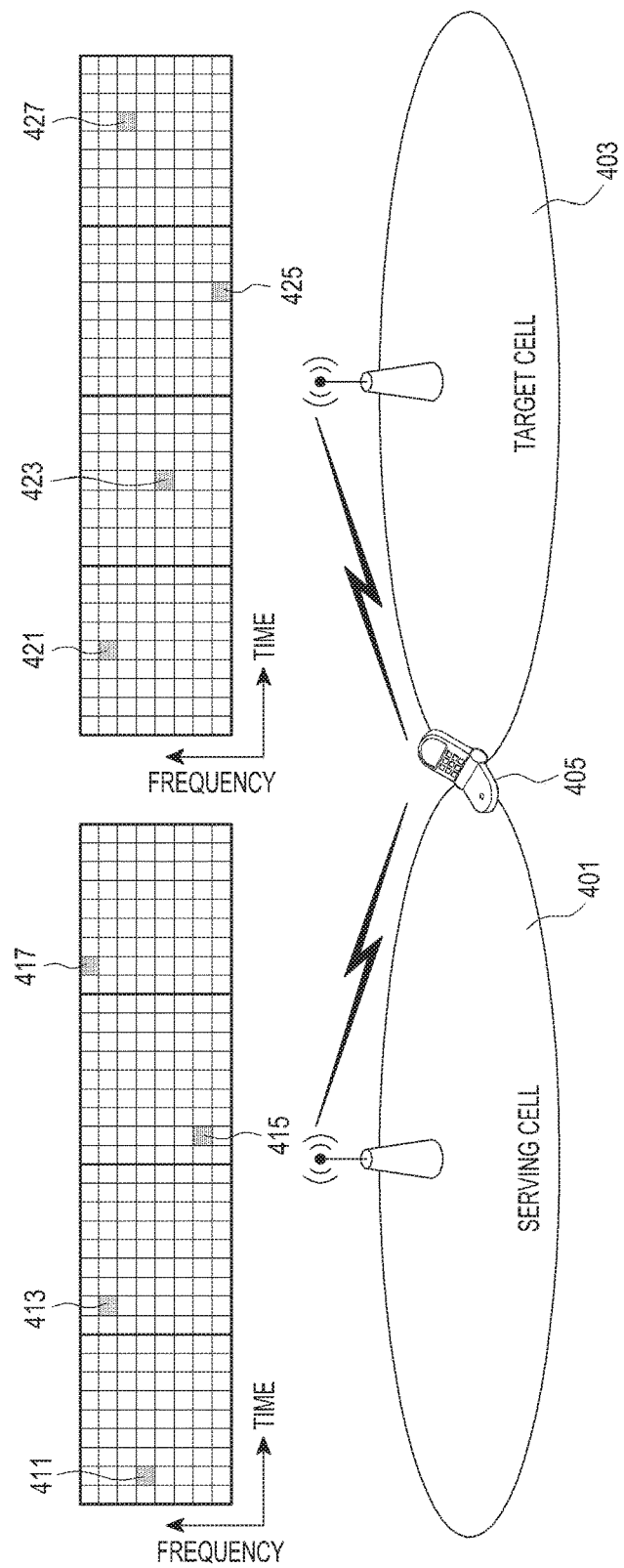
FIG. 4 is a view illustrating a system in which a serving cell and a target cell bi-cast DL traffic in different frequencies and time slots when a terminal hands over and resources used in each cell.

FIG. 4 is a view illustrating examples of a system in which a serving cell and a target cell bi-cast DL traffic in different frequencies and time slots when a terminal hands over and resources used in each cell.

Referring to FIG. 4, a base station of a serving cell 401 and a base station of a target cell 403 bi-cast DL traffic to a terminal 405 performing handover from the serving cell 401 to the target cell 403. In this case, the serving cell 401 and the target cell 403 may use different frequency-time resources. Specifically, the base station of the serving cell 401 uses frequency-time resources 411, 413, 415, and 417, but the base station of the target cell 403 may use frequency-time resources 421, 423, 425, and 427 in the bi-cast transmission. It can be verified from FIG. 4 that the frequency time resources 411, 413, 415, and 417, and the frequency time resources 421, 423, 425, and 427 may have different frequency and time slots.

According to a preferred embodiment of the present disclosure, the base station may determine whether a handover is required, and when a handover is required, the target cell as well as the serving cell may bi-cast downlink (DL) traffic in the same frequency and time slot, thereby allowing for support of mobility of a terminal without handover signaling.

Figure 5:
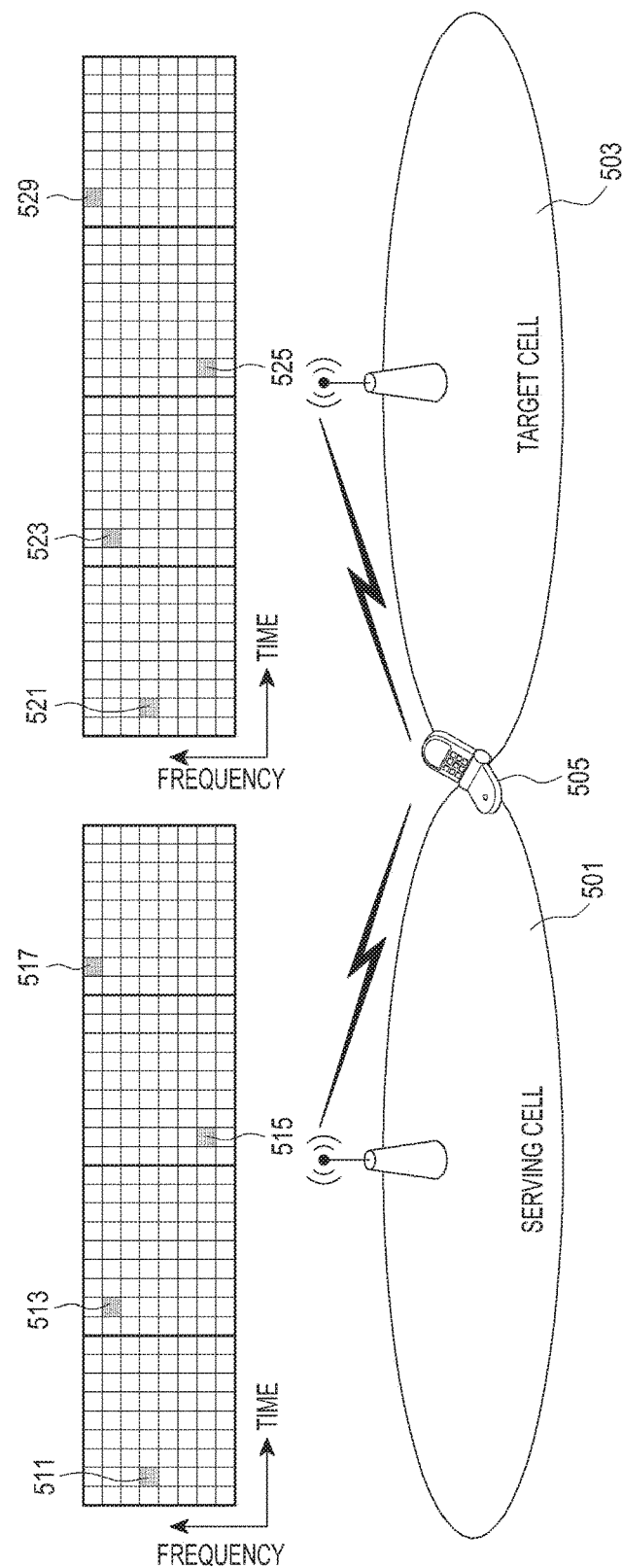
FIG. 5 is a view illustrating a system in which a serving cell and a target cell bi-cast DL traffic in the same frequency and time slot when a terminal hands over and resources used in each cell.

FIG. 5 is a view illustrating examples of a system in which a serving cell and a target cell bi-cast DL traffic in the same frequency and time slot when a terminal hands over and resources used in each cell.

Referring to FIG. 5, a base station of a serving cell 501 and a base station of a target cell 503 bi-cast DL traffic to a terminal 505 handing over from the serving cell 501 to the target cell 503. Here, the serving cell 501 and the target cell 503 may use the same frequency and time resource. Specifically, the base station of the serving cell 501 uses frequency time resources 511, 513, 515, and 517 for bi-cast transmission, and the base station of the target cell 503 uses frequency-time resources 503, 521, 523, 525, and 527 for bi-cast transmission. It can be verified from FIG. 5 that the frequency time resources 511, 513, 515, 517, and the frequency time resources 521, 523, 525, and 527 have the consistent frequency and time slots.

UL traffic bi-cast transmission in accordance with a preferred embodiment of the present disclosure may be performed in such a way that the serving cell and the target cell together perform reception and decoding of UL traffic and transfer to the BSC during a time interval during which channel deactivation occurs in the serving cell after channel deactivation has been performed in the target cell. Here, the BSC may process the UL traffic by transferring, to the MSC, the signal that has passed cyclical redundancy check (CRC) among two traffic signals from the serving cell and the target cell.

The down link slow associated control channel (DL SACCH) signaling process in the interval during which the traffic bi-cast transmission applies is transmitted only in the serving cell before handover (HO) indication and only in the target cell after the handover (HO) indication. Further, regarding timing advance (TA) and UL power control (PC), before the handover (HO) indication, the TA or UL PC of the serving cell is transmitted via DL SACCH, and after the handover (HO) indication, the TA or UL PC of the serving cell is transmitted via DL SACCH.

A UL SACCH signaling process in the interval during which the traffic bi-cast transmission applies may be performed in such a manner that the serving cell and the target cell both decode and transfer the UL SACCH signal, and the BSC selects a signal having passed a CRC like the UL traffic processing does.

Figure 6A:
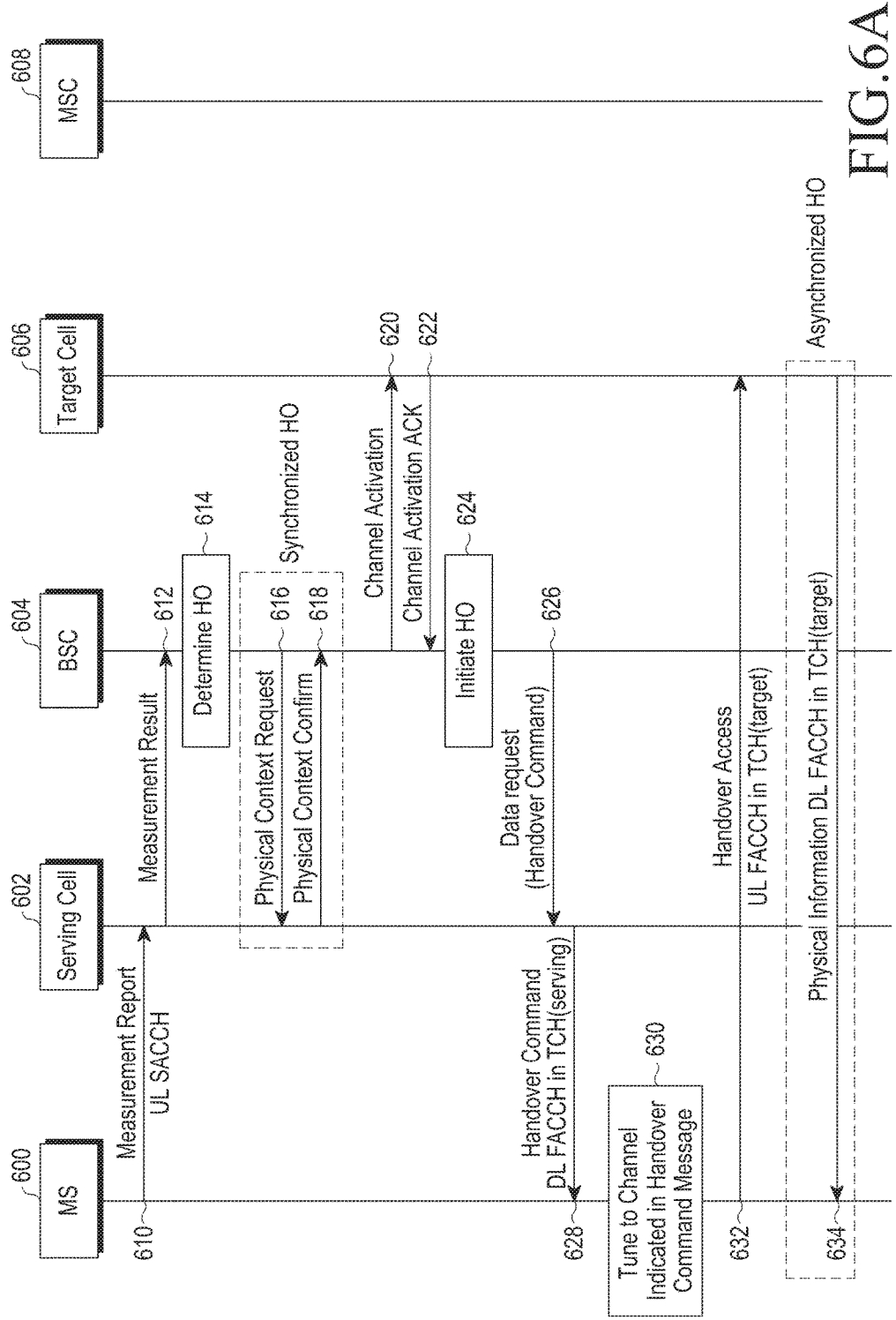
FIGS. 6a and 6b are views illustrating handover methods that are accompanied by handover signaling of a terminal according to an embodiment of the present disclosure.
Figure 6B:
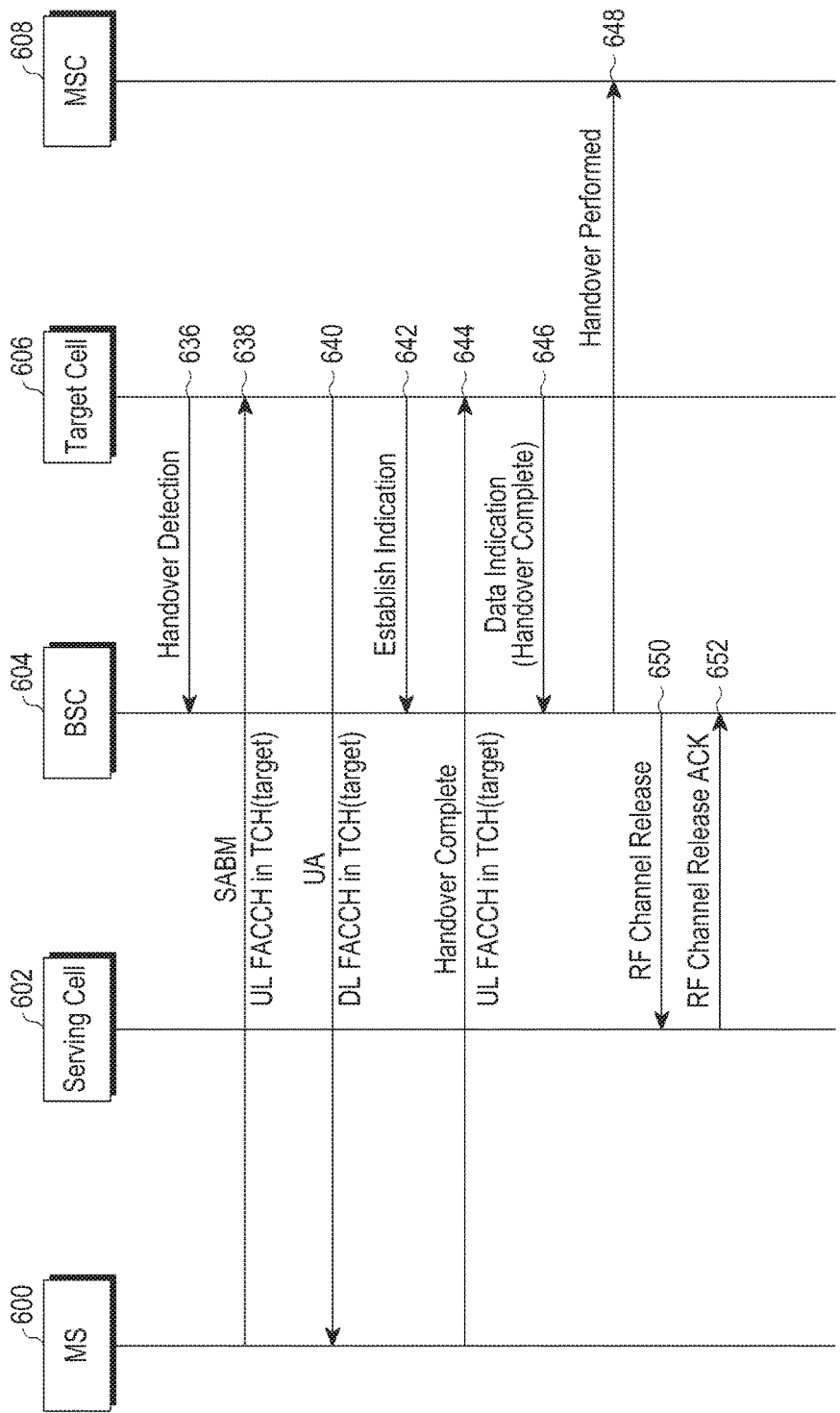

FIGS. 6a and 6b are views illustrating a handover scheme that is accompanied by handover signaling of a terminal according to an embodiment of the present disclosure.

Referring to FIGS. 6a and 6b, a handover scheme for supporting the mobility of a terminal in a relevant mobile communication system comes with complicated signaling for handover between a terminal 600 and a network entity (for example, BTSs 602 and 606, a BSC 604, or MSC 608).

The terminal 600 transmits a measurement report to the base station 602 (610). The measurement report is a type of UL SACCH signaling. The measurement report may include the receiving (Rx) quality of the serving cell, a receiving (Rx) level of the serving cell or receiving level information on neighboring adjacent cells. the measurement report information may include BCCH frequency information and a base station identity code (BSIC), which is identification information regarding a base station.

The base station of serving cell 602 having received the measurement report transmits a measurement result to the BSC 604 (612).

The BSC 604 receiving the measurement result determines whether to perform a handover using the measurement result (614).

The BSC 604 having determined the handover may transmit a physical context request to the base station 602 of the serving cell (616) and may receive a physical context confirm in response to the physical context request (618). The physical context request 616 message may include timing advance (TA) information. The serving cell 602 and the BSC 604 may perform synchronized handover (HO) using the timing advance information.

The BSC 604 may transmit a channel activation message 620 to the base station 606 of the target cell to activate the traffic channel in the target cell (620), and the BSC 604 may receive a channel activation ACK message 622 in response to the transmit channel activation message (622).

The BSC 604 having received the channel activation confirm 622 performs handover (HO) initialization (624), and the BSC 604 transmits a data request message 626, which is a handover command, to the base station 602 of the serving cell (626).

The base station 602 having received the data request message 626 transmits a handover command message 628 to the terminal 600 (628). The handover command message 628 may include information regarding the frequency and time slot to be changed (in the target cell) and may also include information regarding output power to be used by the terminal 600. The handover command message 628 may be transmitted to the terminal 600 via a down link fast associated control channel (DL FACCH) of the serving cell.

The terminal 600 having received the handover command message 628 performs tuning 630 to the channel (frequency and time slot) of the target cell indicated in the handover command message 628 (630), and the terminal 600 transmits a handover access message informing the acceptance of handover to the base station 606 of the target cell (632). The handover access message 632 may be transmitted through the UL traffic channel FACCH of the traffic channels of the target cell. Since the terminal 600 is not fully synchronized with the target cell 606 to transfer a normal burst, the handover access message 632 may be transferred via an access burst.

The target cell base station 606 having received the handover access message 632 may transmit physical information to the terminal 600 (634) and may transmit a handover detection message 636 to the BSC 604 (636). The physical information 634 may include TA information transferred from the base station 606 of the target cell to the terminal 600. Before the transmission of the physical information 634, the base station 606 of the target cell may acquire an eight-bit handover (HO) reference using the received access burst and may determine whether the received handover access request 632 is a valid and appropriate handover access request by making comparison with the handover reference.

The terminal 600 transmits a set asynchronous balanced mode (SABM) message to the base station 606 of the target cell (638) and receives an unnumbered acknowledge message 640 from the base station 606 of the target cell (640). Further, the base station 606 of the target cell transmits an establish indication message to the BSC 604 (642). The SABM message 638 and the UA message 640 are data link layer connection messages transmitted via the FACCH of the traffic channels of the target cell.

The terminal 600 having completed the establishment of the data link layer by receiving the UA message 640 transmits a handover complete message to the base station 606 of the target cell 606 of the target cell (644), and the base station 606 of target cell receiving the handover complete message 644 transmits a data indication message informing the completion of handover to the BSC 604 (646). Subsequently, the BSC 604 receiving the data indication message 646 transmits a handover performed message to the MSC 608 (648) to inform the completion of handover. The handover complete message 644 transmitted from the terminal 600 to the base station of the target cell 606 may be transmitted via the UL FACCH.

The BSC 604 transmits a RF channel release message instructing to release the traffic channel to the base station 602 of the serving cell (650) and receives a RF channel release ACK message from the base station 602 of the serving cell (652).

Figure 7:
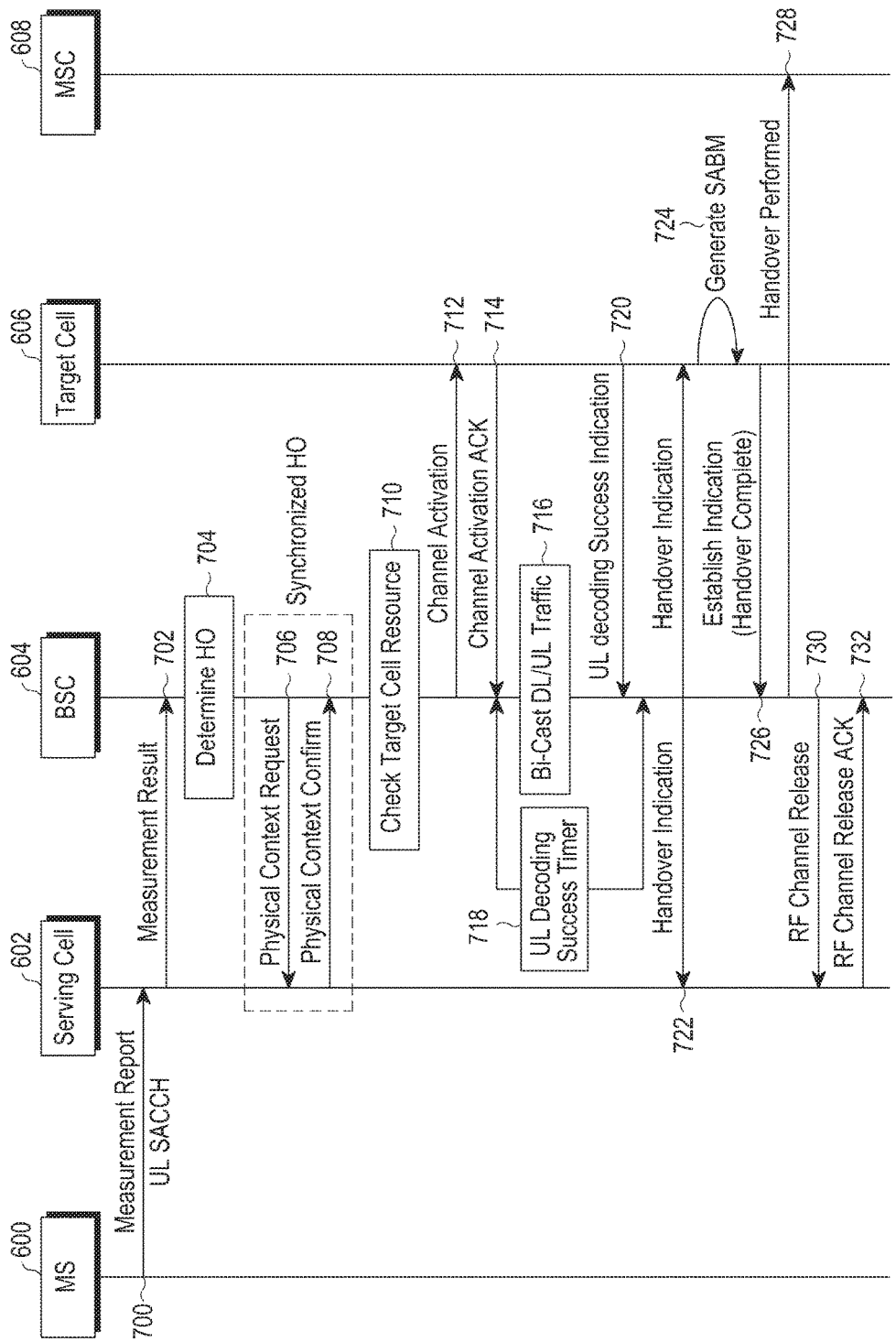
FIG. 7 is a view illustrating a handover method including bi-cast traffic transmission according to an embodiment of the present disclosure.

FIG. 7 is a view illustrating a handover method including bi-cast traffic transmission according to an embodiment of the present disclosure.

According to a preferred embodiment of the present disclosure described in connection with FIG. 7, a terminal may be enabled to hand over without complicated signaling between the terminal and a base station as exemplified in connection with FIG. 6, preventing a handover delay and call drop. Further, one or more cells (serving cell and target cell) for which the terminal is to perform handover may be recognized as a single cell, allowing for the achievement of the frequency reuse factors of 1 and increased spectral efficiency.

Steps 700 to 708 of FIG. 7 are the same as steps 610 to 618 of FIG. 6*a*, and therefore, no detailed description thereof is given.

A BSC 604 performs the operation of the target cell resource check (710). The BSC 604 may perform a dynamic frequency resource allocation (DFRA) allocating dynamically the frequency resources according to a result of the target cell resource check (710). The resource checked in operation 710 is a frequency resource and a time slot resource. As the result of the resource check (710), in case the same resources as resources used by the serving cell resources is available in the target cell, the BSC 604 performs handover without transfer of handover signal (for example, a handover command message) to the terminal. Meanwhile, as the result of the resource check (710), in case the same resources as resources used by the serving cell is 'unavailable' in the target cell, the BSC 604 performs handover in such a manner as to transfer a handover signal to the terminal (the scheme as shown in FIG. 6).

Preferably, in case the result of target cell resource check 710 is 'available', the BSC 604 may further check whether the same resource as a resource used by the serving cell is used in neighboring cells of the target cell. The addition check is for enabling allocation of resources to the same frequency and time slot resources as those of the serving cell even upon occurrence of subsequent handover that may continuously occur after a handover to the target cell. As the result of additional check, in the case that the same resource as a resource used by the serving cell in the neighboring cells of the target cell is used, the BSC 604 may further perform an operation to change the resource allocation to allow adjacent cells of the target cell to use other resources.

The BSC 604 transmits a channel activation message to the base station 606 of the target cell to activate a traffic channel of the target cell (712), and the BSC 604 receives a channel activation ACK in response to a channel activation message (714).

The BSC 604 having received the channel activation acknowledgment 714 controls the base station of the serving cell and the base station of the target cell to bi-cast the UL/DL traffic without transmitting a handover command message (716). At this time the base station of the serving cell and the base station perform bi-cast transmission using the same frequency resources and time slot resources. The terminal 600 performs a handover without handover signaling with the base stations 602 and 606 and the BSC 604 and without a procedure of tuning to a new channel (to which to be changed due to the handover). The terminal 600 transmits and receives traffic while recognizing the serving cell and the target cell as a single cell.

Further, the BSC 604 having received the channel activation ACK 714 drives the UL decoding success timer for a period of time (718).

In case the BSC 604 receives a UL decoding success indication message 720 from the base station 606 of the target cell before the timer 718 expires (720), the BSC 604 performs the subsequent procedures without transferring handover signals. The UL decoding success indication message 720 includes an indicator to confirm whether a resource and TA of the target cell are normal, and the UL decoding success indication message 720 is a message transferred to the BSC 640 from the base station 606 of the target cell in case a certain condition is met. An example of the certain condition may include the case where it is instructed by the BSC 604 to use the same resource as a resource of the base station 602 of target cell for the terminal 600, and the UL signal received from the terminal 600 is decoded successfully.

However, in case the BSC 604 fails to receive the UL decoding success indication message 720 from the base station 606 of the target cell before the timer 718 expires, the BSC 604 performs a handover procedure in such a way as to transfer a handover signal to the terminal 600. The handover procedure for failure to receive the UL decoding success indication message 720 is described in detail with reference to FIG. 8.

The base station 606 of the target cell, which has transmitted the UL decoding success indication message 720 to the BSC 604, exchanges handover indication messages with the base station 602 of serving cell (722). The handover indication message is a message to inform the transmission-on/off of SACCH and to indicate that data processing is started in the target cell. In other words, before the UL decoding success indication (722), transmission of the SACCH is performed only in the serving cell, and after the UL decoding success indication (722), the SACCH transmission and data processing are performed only in the target cell.

The base station of the target cell 606 performs SABM generation independently (724). In other words, in a preferred embodiment of the present disclosure, the signaling for the SABM does not occur between the base station 606 of the target cell and terminal 600. The SABM generation 724 may include an operation in which the target cell itself generates SAMB and an operation for generating a LAPDm (link access procedures, D channel-m; data link layer protocol used in GSM).

The base station 606 of the target cell transmits an established indication message to the BSC 604 (726). The establish indication message 726 is a message that also plays a role as a data indication message to inform handover completion.

Then, the BSC 604 having received the establishment indication message 726 informs the MSC 608 of the handover completion by sending a handover performed message to the MSC 608 (728).

The BSC 604 transmits a RF channel release message to indicate the release of traffic channel to the base station 602 of serving cell (730) and receives a RF channel release ACK message from the base station 602 of the serving cell (732).

Figure 8A:
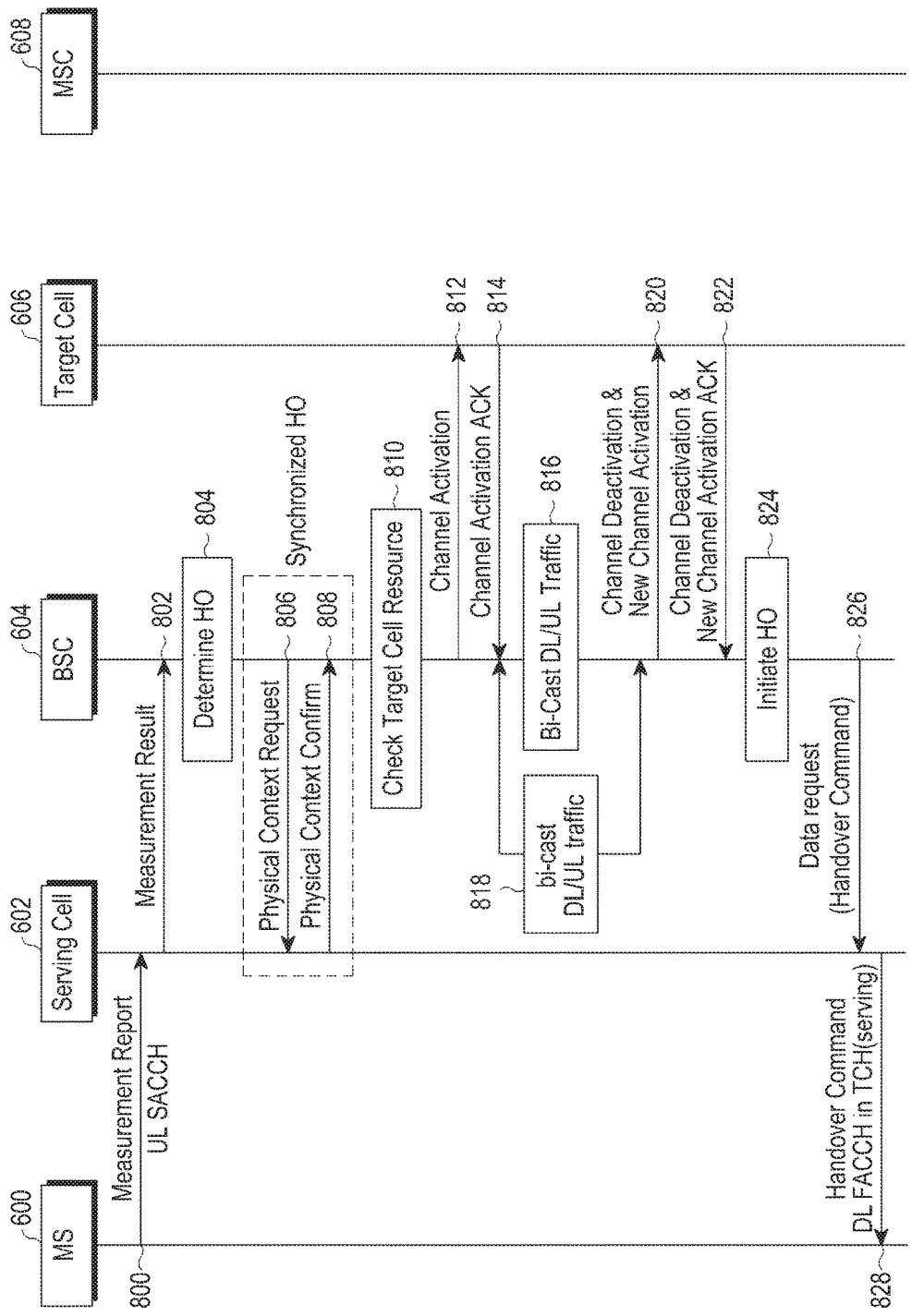
FIGS. 8a and 8b are views illustrating handover methods including bi-cast traffic transmission according to another embodiment of the present disclosure.
Figure 8B:
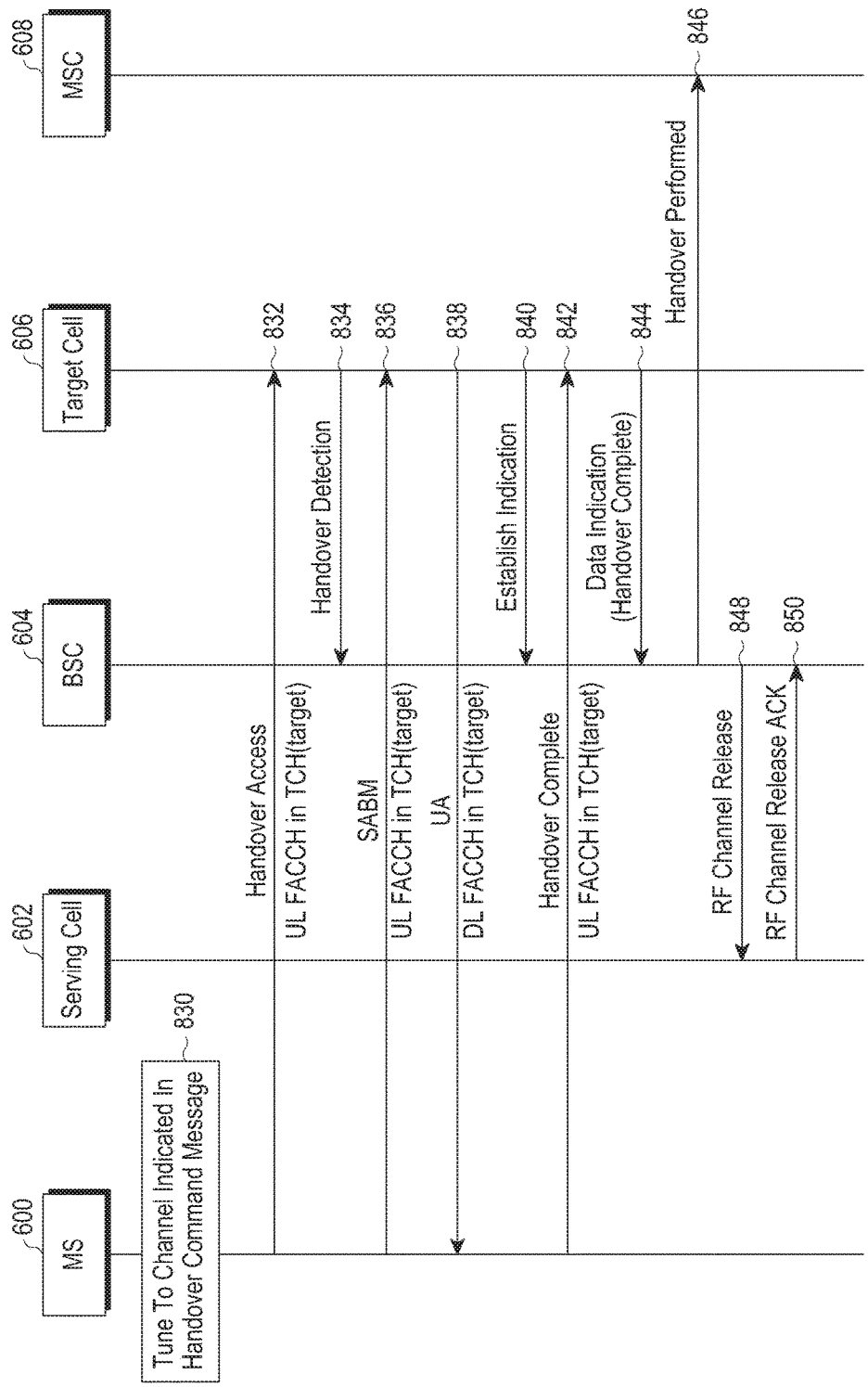

FIGS. 8a and 8b are views illustrating handover schemes including bi-cast traffic transmission according to another embodiment of the present disclosure.

FIGS. 8a and 8b illustrate an operation when a target cell fails to decode UL traffic signals of a terminal according to another embodiment of the present disclosure.

Steps 800 to 818 of FIG. 8a are the same as steps 700 to 718 of FIG. 7, and therefore, no detailed description thereof is given.

In case the BSC 604 receives a UL decoding success indication message from a base station 606 of a target cell before a UL decoding success timer 818 expires (720), the BSC 604 performs the subsequent procedure without transferring a handover signal to the terminal 600. The handover procedure in case the BSC 604 receives the UL decoding success indication message 720 from the base station 606 of the target cell has been described in connection with FIG. 7, and thus, no further detailed description thereof is given herein. Meanwhile, in case the BSC 604 fails to receive the UL decoding success indication message 720 from the base station 606 of the target cell before the timer 818 expires, the BSC 604 performs a handover procedure in such a way as to transfer the handover signal to the terminal 600.

In case the BSC 604 fails to receive the UL decoding success indication message from the base station 606 of the target cell before the timer 818 expires (720), the BSC 604 transmits a channel deactivation and new channel activation message to the base station 606 of the target cell (820). That is, the BSC 604 activates new resources (i.e., resources different from the resources of the serving cell) for the base station of the target cell that has failed the UL traffic decoding and instructs to support a handover of the terminal. The channel deactivation and new channel activation message 820 instructs the operations of deactivating the channel allocated with the same resources as those of the serving cell and activating resource allocated as new resources, which are different from those of the serving cell.

The base station 606 of the target cell having received the channel deactivation and new channel activation message 820 performs an operation indicated by the message 820 and transmits a channel deactivation and new channel activation ACK message in response to the channel deactivation and new channel activation message 820 (822).

The BSC 604 having received the channel deactivation and new channel activation message 820 performs handover (HO) initiation (824) and transmits a data request message, which is a handover command, to the base station 602 of the serving cell (826).

The base station 602 of the serving cell having received the data request message 826 transmits a handover command message to the terminal 600 (828). The handover command message 828 may include information about the frequency and time slot to which to be changed (in the target cell) and may include information about output power to be used by the terminal. The handover command message 828 may be transferred to the terminal 600 via a DL FACCH.

The terminal 600 having received the handover command message 828 performs tuning to the channel (frequency and time slot) of the target cell indicated by the handover command message 828, and the terminal 600 transmits a handover access message indicating handover accept to the base station 606 of target cell (832). The handover access message 832 may be transmitted through a UL FACCH of traffic channel of the target cell.

The base station 606 of the target cell having received the handover access message 832 transmits the handover detection message to BSC 604 (834).

The terminal 600 transmits an SABM messages to the base station 606 of the target cell (836) and receives a UA message 838 from the base station 606 of the target cell (838). Further, the base station 606 of the target cell transmits an establish indication message to the BSC 604 (840). The SABM message 836 and the UA message 838 are data link layer connection messages transmitted via the FACCH.

The terminal 600 having received the UA message 838 to complete the establishment of the data link layer transmits a handover complete message to the base station 606 of the target cell (842), and the base station 606 of the target cell having received the handover complete message 842 transmits a data indication message informing the completion of handover to the BSC 604 (844). Then, the BSC 604 having received the data indication message 844 transmits a handover performed message 846 to the MSC 608 to inform the MSC 608 of the completion of handover. The handover complete message 842 transmitted from the terminal 600 to the base station 606 of the target cell may be transmitted via the UL FACCH.

The BSC 604 transmits the RF channel release message instructing to release the traffic channel to the base station 602 of the serving cell (848) and receives a RF channel release ACK message from the base station 602 of the serving cell (850).

Figure 9:
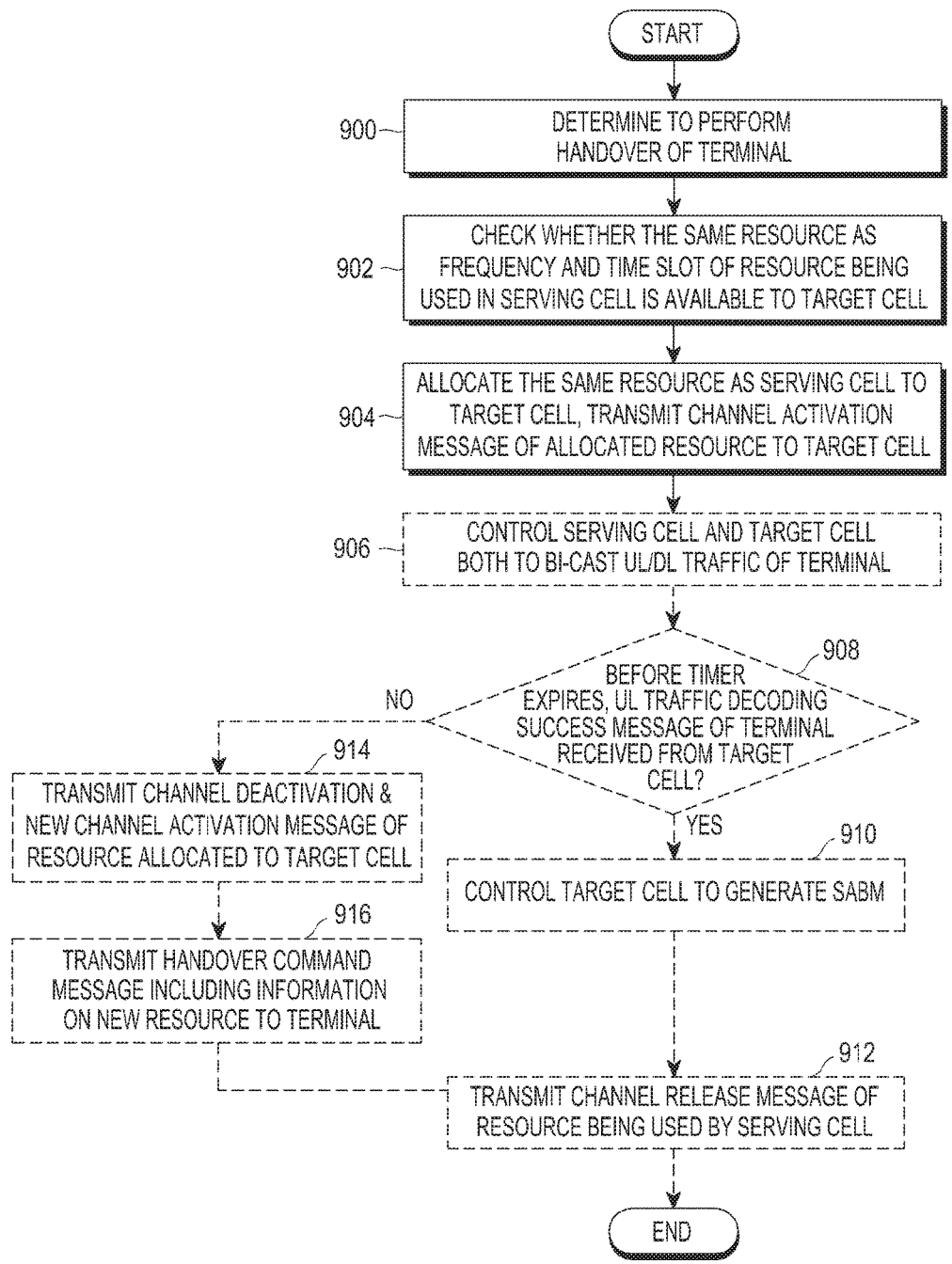
FIG. 9 is a view illustrating a handover supporting method of a BSC according to a preferred embodiment of the present disclosure.

FIG. 9 is a view illustrating a handover supporting scheme of a BSC according to a preferred embodiment of the present disclosure.

The BSC determines whether a terminal performs a handover using, e.g., a measurement result reported from the terminal (900).

The BSC checks whether a resource of the same frequency and time slot as a frequency and time slot of a resource in use by a base station of the serving cell is available to the base station of the target cell so that the terminal may perform a. handover to the target cell even without handover signaling (902). At this time, the resource being used by the base station of the serving cell may be determined by at least one of channel group information, hopping sequence number (HSN), and mobile allocation index offset (MAIO).

In case the resource of the same frequency and time slot is available to the base station of the target cell, the BSC allocates the resources of the same frequency and time slot to the base station of the target cell and transmits a message indicating the channel activation of the allocated resources to the base station of the target cell (904).

The following operation is not an essential configuration to realize an embodiment of the present disclosure but may optionally be included in order to support the handover of the terminal.

The BSC may instruct the base station of the serving cell and the base station of target cell to perform bi-cast transmission so that the base station of the serving cell and the base station of the target cell transmit UL/DL traffic (906).

The BSC may drive a timer to receive a UL decoding success indication message from the base station of the target cell and may check whether the UL decoding success indication message is received before the timer expires (908).

In case the UL decoding success indication message from the base station of the target cell is received before the expiration of the timer, the BSC may transmit a message instructing to generate SABM to the target cell (910) to thereby support the terminal so that the terminal may perform handover even without sending a signal for the handover.

Meanwhile, in case the UL decoding success indication message from the base station of the target cell is not received before the expiration of the timer, the BSC may transmit a message instructing to deactivate the channel of the resource allocated to the target cell and to activate a new channel to the target cell (914). Further, the BSC may transmit a handover command message including information about the new channel to the terminal via the base station of the serving cell (916) to thereby support the terminal to perform handover in such a way as to transfer the handover signal.

The BSC may complete the handover procedure of the terminal by transmitting a channel release message of the resource being used by the base station of the serving cell to the base station of the serving cell (912).

Figure 10:
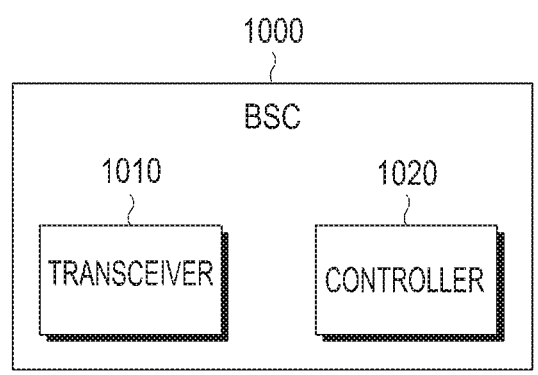
FIG. 10 is a view illustrating a configuration of a BSC apparatus according to a preferred embodiment of the present disclosure.

FIG. 10 is a view illustrating a configuration of a BSC according to a preferred embodiment of the present disclosure.

The BSC 1000 may include a controller 1020 controlling to perform the above-described operations of the BSC and a transceiver 1010 performing communication (transmission/reception of signals and/or messages) with a terminal, a serving cell base station, and a target cell base station in the mobile communication system under the control of the controller 1020.

The overall operation of the BSC described in this disclosure may be understood to be the operation of the controller 1020 of the BSC 1000.

Table 1 is a table for describing an allocation criteria of time slots when handover occurs between sectors within the same cell according to an embodiment of the present disclosure.

TABLE 1

| | Time Slot | | | | | | | |
|---|---|---|---|---|---|---|---|---|
| | #0 | #1 | #2 | #3 | #4 | #5 | #6 | #7 |
| Alpha | allocated | | | | | allocated | | |
| Beta | | allocated | | | | | allocated | allocated |
| Gamma | allocated | | allocated | | | allocated | | |

Table 1 indicates whether the time slot is previously allocated to each sector within the cell.

In case the operation of the time slot is necessary for the terminal that performs handover between sectors in the cellular mobile communication system, a time slot may be allocated to each sector within one cell by the following principle considering the handover.

The base station in charge of the cell first allocates the time slot unused by other sectors for the position of each time slot upon user allocation in each sector within the same cell.

As an example, when a new user enters into the cell by handover in accordance with the principle, the sequence for time slot allocation is as follows.

Alpha Sector: #3→#6→#7→#1→#2→#5

Beta Sector: #3→#6→#0→#2→#4

Gamma Sector: #3→#6→#7→#1→#4

The alpha sector is specifically described. Time slots #3 and #6 allocated by no sector may have the highest priority, and time slots #7, #1, and #2 previously allocated by another sector may have the second highest priority. Time slot #5 previously allocated by two other sectors may be allocated last. Time slots #0 and #4 allocated in advance by the alpha sector are excluded from the priority of allocation.

Table 2 is a table for describing an allocation criteria of time slots when a particular sector operates two TRXs in the case where the handover occurs between sectors within the same cell according to an embodiment of present disclosure.

TABLE 2

| | | \#0 | \#1 | \#2 | \#3 | \#4 | \#5 | \#6 | \#7 |
|---|---|---|---|---|---|---|---|---|---|
| Alpha | TRX#0 | allocated | | | | allocated | | | |
| | TRX#1 | | allocated | | | | | allocated | |
| Beta | TRX#0 | | | allocated | | | allocated | | allocated |
| Gamma | TRX#1 | allocated | | | allocated | | allocated | | |

Table 2 indicates whether time slot has been previously allocated to each sector. Table 2 shows an example in which a time slot has been previously allocated to each sector when the alpha sector operates two TRXs, and the beta sector and gamma sector operate one TRX.

As an example, when a new user enters into the cell by handover in accordance with the principle, the sequence for the time slot allocation is as follows.

Alpha Sector: #3 (0)→#4 (1)→#6 (0)→#7 (0,1)→#0 (1)→#1 (0)→#2 (0, 1)→#5 (0,1)

Beta Sector: #3→#4→#6→#2→#0

Gamma Sector: #3→#4→#6→#7→#1

It should be noted that the examples of exemplary view of system configuration, exemplary view of resource structure, exemplary view of resource allocation, exemplary view of handover scheme of system, and exemplary view of BSC device structure, as illustrated in FIGS. 2 to 10, are not intended to limit the scope of the present invention. In other words, all the components or operation steps illustrated in FIGS. 2 to 10 should not be construed as essential components to practice the present invention, and the present invention may be rather implemented with only some of the components without departing from the gist of the present invention.

The above-described BSC, serving cell base station, target cell base station, and operations of terminal may be realized by equipping a memory device retaining their corresponding codes in the entity of the communication system, base station, base station controller or any component of the terminal. That is, the controller in the entity, base station, base station controller or controller of the terminal may execute the above-described operations by reading and executing the program codes stored in the memory device by a processor or central processing unit (CPU).

As described herein, entity, base station, base station controller and various components or modules in the terminal may be operated using a hardware circuit, e.g., a complementary metal oxide semiconductor-based logic circuit, firmware, software, and/or using a hardware circuit such as a combination of hardware, firmware, and/or software embedded in a machine-readable medium. As an example, various electric structures and methods may be executed using electric circuits such as transistors, logic gates, or ASICs.

Although specific embodiments of the present disclosure have been described above, various changes may be made thereto without departing from the scope of the present disclosure. Thus, the scope of the present disclosure should not be limited to the above-described embodiments, and should rather be defined by the following claims and equivalents thereof.

The invention claimed is:

1. A method of supporting a handover by a base station controller in a cellular communication system including a terminal performing the handover from a base station of a serving cell to a base station of a target cell, the method comprising:

determining, by the base station controller, to perform the handover of the terminal;

checking, by the base station controller, whether a resource, in a frequency domain and a time domain, being used by the base station of the serving cell is available to the base station of the target cell;

allocating, by the base station controller, the same resource, in the frequency domain and the time domain, to the base station of the target cell based on the check result;

transmitting, by the base station controller, a message instructing to activate a channel with the allocated same resource to the base station of the target cell;

controlling, by the base station controller, both the base station of the serving cell and the base station of the target cell to transmit downlink traffic of the terminal together or receive uplink traffic of the terminal together on the channel with the allocated same resource, during a time interval;

driving a timer for a certain period of time; and checking whether a message indicating success in decoding the uplink traffic of the terminal is received from the base station of the target cell before the timer expires.

2. The method of claim 1, wherein the frequency domain of the resource being used by the base station of the serving cell is determined by at least one of channel group information, a hopping sequence number (HSN), or a mobile allocation index offset (MAIO).

3. The method of claim 1, further comprising controlling the base station of the target cell to generate a set asynchronous balanced mode (SABM) in a case where the message indicating success in decoding is received as a result of checking whether the message indicating success in decoding is received.

4. The method of claim 3, wherein, before controlling the base station of the target cell to generate the SABM, the base station of the serving cell is controlled to communicate a slow associated control channel (SACCH) signal with the terminal, and wherein, after controlling the base station of the target cell to generate the SABM, the base station of the target cell is controlled to communicate the SACCH signal with the terminal.

5. The method of claim 1, further comprising:

unless the message indicating success in decoding is received, transmitting a message instructing to deactivate the channel of the allocated same resource and to activate a channel of a new resource to the base station of the target cell; and transmitting a handover command message including information on the new resource to the terminal via the base station of the serving cell.

6. The method of claim 1, further comprising:
changing the resource allocation to prevent the adjacent cell of the target cell from using the same resource if the adjacent cell of the target cell uses the same resource.

7. The method of claim 1, further comprising, before determining to perform the handover of the terminal, allocating a call of the terminal to a resource with the least interference from an adjacent cell of the base station of the serving cell.

8. The method of claim 1, further comprising transmitting a message instructing to release the channel of the resource being used by the base station of the serving cell to the base station of the serving cell.

9. A base station control device for supporting handover of a terminal in a cellular mobile communication system including a terminal performing handover from a base station of a serving cell to a base station of a target cell, the base station control device comprising:
a transceiver communicating with the terminal; and
a processor coupled with the transceiver and configured to:
determine to perform the handover of the terminal,
check whether a resource, in a frequency domain and a time domain, being used by the base station of the serving cell is available to the base station of the target cell, based on whether at least one other cell adjacent to the target cell uses the same resource in the frequency domain and the time domain,
allocate the same resource, in the frequency domain and the time domain, to the base station of the target cell based on the check result,
control the transceiver transmit a message instructing to activate a channel with the allocated same resource to the base station of the target cell,
control the base station of the serving cell and the base station of the target cell to transmit downlink traffic of the terminal together or receive uplink traffic of the terminal together on the channel with the allocated same resource, during a time interval,
drive a timer for a certain period of time, and
check whether a message indication success in decoding of the uplink traffic of the terminal is received from the base station of the target cell before the timer is expired.

10. The base station control device of claim 9, wherein the frequency domain of the resource being used by the base station of the serving cell is determined by at least one of channel group information, a hopping sequence number (HSN), or a mobile allocation index offset (MAIO).

11. The base station control device of claim 9, wherein the processor is further configured to control the base station of the target cell to generate a set asynchronous balanced mode (SABM) in a case where the message indicating success in decoding is received as a result whether the message indicating success in decoding is received.

12. The base station control device of claim 11,
wherein, before controlling the base station of the target cell to generate the SABM, the processor is further configured to control the base station of the serving cell to communicate a slow associated control channel (SACCH) signal with the terminal, and
wherein, after controlling the base station of the target cell to generate the SABM, the processor is further configured to control the base station of the target cell to communicate the SACCH signal with the terminal.

13. The base station control device of claim 9, wherein, unless the message indicating success in decoding is received, the processor is further configured to:
control the transceiver to transmit a message instructing to deactivate the channel of the allocated same resource and to activate a channel of a new resource to the base station of the target cell, and
control the transceiver to transmit a handover command message including information on the new resource to the terminal via the base station of the serving cell.

14. The base station control device of claim 9, wherein the processor is further configured to change the resource allocation to prevent the adjacent cell of the target cell from using the same resource if the adjacent cell of the target cell uses the same resource.

15. The base station control device of claim 9, wherein, before determining to perform the handover of the terminal, the processor is further configured to allocate the call of the terminal to a resource with the least interference from an adjacent cell of the base station of the serving cell.

16. The base station control device of claim 9, wherein the processor is further configured to control the transceiver to transmit a message instructing to release the channel of the resource being used by the base station of the serving cell to the base station of the serving cell.

* * * * *